May 3, 1960
W. KASTEN ET AL
2,934,791
METHOD OF FORMING FILTER ENDCAPS
Original Filed Oct. 22, 1953
2 Sheets-Sheet 1
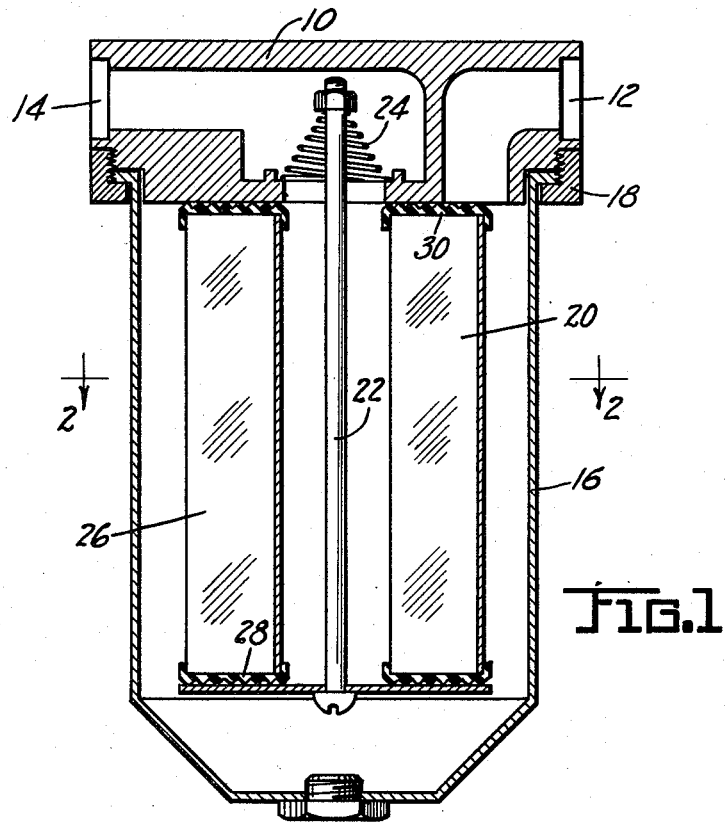
FIG.1
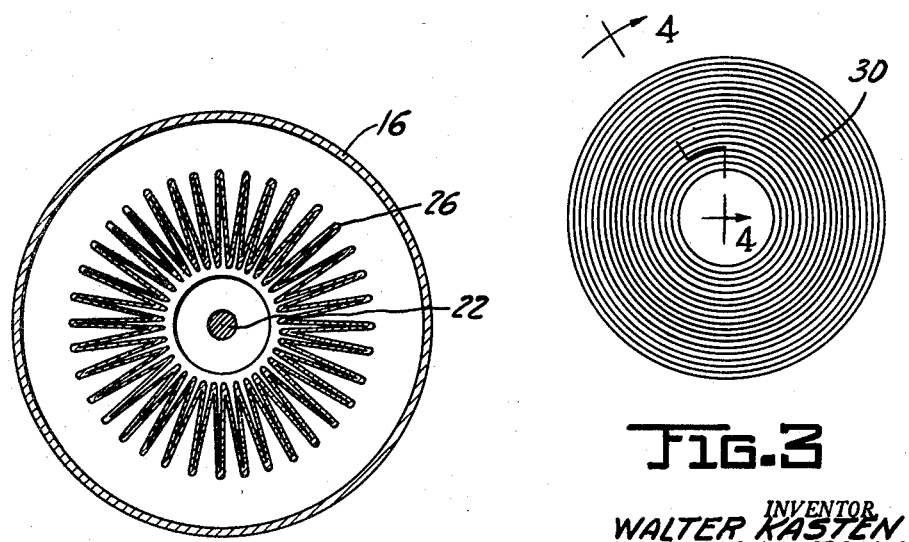
FIG.2
FIG.3
INVENTOR
WALTER KASTEN
ABBOTT M. ROHN
BY
William N. Antonio
ATTORNEY May 3, 1960 W. KASTEN ET AL 2,934,791
METHOD OF FORMING FILTER ENDCAPS
Original Filed Oct. 22, 1953 2 Sheets-Sheet 2

INVENTOR.
WALTER KASTEN
ABBOTT M. ROHN
BY
William N. Antonio
ATTORNEY

United States Patent Office 2,934,791
Patented May 3, 1960

2,934,791

METHOD OF FORMING FILTER ENDCAPS

Walter Kasten and Abbott M. Rohn, Detroit, Mich., assignors to Bendix Aviation Corporation, South Bend, Ind., a corporation of Delaware Original application October 22, 1953, Serial No. 387,734, now Patent No. 2,771,156, dated November 20, 1956. Divided and this application February 7, 1956, Serial No. 564,005

2 Claims. (Cl. 18—59)

This invention relates to filters, and more specifically to a method of forming endcaps on filter elements.

This application is a division of our copending application Serial No. 387,734, filed October 22, 1953, now Patent No. 2,771,156, issued November 20, 1956.

The conventional replaceable filter element may take any of a number of forms of which one of the more common is the pleated paper type. In producing this type of element, a length of filter paper is usually treated with a resinous impregnating substance, such as a phenolic condensation product, folded into pleats of the desired dimension, formed into cylindrical shape, and heated to a temperature and for a time sufficient to polymerize the resinous substance. A final step is the bonding of end plates to each end of the pleated member. When the element is placed in the filter housing, it is usually necessary that a gasket be provided to insure a seal between the inlet and outlet passages, so that unfiltered material will not by-pass the filter element. Thus several processes are necessary: forming the cylindrical member, making the endcaps, attaching the endcaps, and finally making and installing a gasket in the housing. The elimination of any of these processes is, of course, highly desirable.

One of the results of the search for cheaper and better replaceable elements was the molded plastic endcap or endplate which was formed and attached to the end of the filter pleats in one operation by the use of a smooth flat mold. This structure, however, presented difficulties in that it did not form a smooth flat surface on the face of the endcap, one reason being that it was almost impossible to prevent the trapping of air which produces pin holes or blisters. In addition, the weight of the element assembly itself was sufficient to squeeze the liquid plastic out from under it, thus causing irregularities in the surface. The applicants have determined that when a groove mold having ridges therein is used, the tendency to trap air is greatly minimized because the contacting area of the ends of the pleated paper with the bed of the mold is far less. The plastic material, instead of being forced to expand vertically as was the case when using a smooth flat mold, now must first fill the grooves formed by the ridges in the mold, thus allowing very little material for vertical expansion. As a result of the ridges in the mold the endcap is formed so that the pleated ends are embedded a predetermined depth from the outer face of the endcap thereby insuring a proper endcap seal and an endcap free of imperfections. The ridges also form smooth, even grooves which seal tightly against a flat surface as in a filter housing. Only a single ridge in the mold need be used where one is concerned only with embedding the pleated ends a predetermined depth from the outer face of the endcap and the sealing means between the inlet and outlet is provided by concentric circular ridges or other configurations on the filter housing adjacent the endcap face. In the present grooved molded endcap the pleats are bonded to the endcaps and the endcap is formed in one operation, the molded endcap serving as a gasket. This last feature, of course, also simplifies installation of the element in the filter housing.

Accordingly, it is an object of the present invention to provide a method of forming a flexible molded filter element endcap which produces an improved seal at the end of a filter element.

Another object of the present invention is to provide a method of producing filter elements in which a leak proof endcap is formed and permanently attached in one operation.

Another object is to provide an improved and economical method of forming an endcap for a filter element.

A further object of this invention is to provide a method of forming a flexible molded endcap for a filter element which can serve as a gasket to insure a seal between the end of the filter element and the filter housing.

A still further object is to provide a method of forming an endcap having a greater shock resistance, thereby reducing scrap due to jarring or dropping.

Other objects and advantages will become apparent from the following description and accompanying drawings, wherein:

Figure 1 is a sectional view of the filter element placed in a standard type of filter housing;

Figure 2 is a sectional view of the filter taken on line 2—2 of Figure 1;

Figure 3 is an end view of the filter element;

Figure 5:
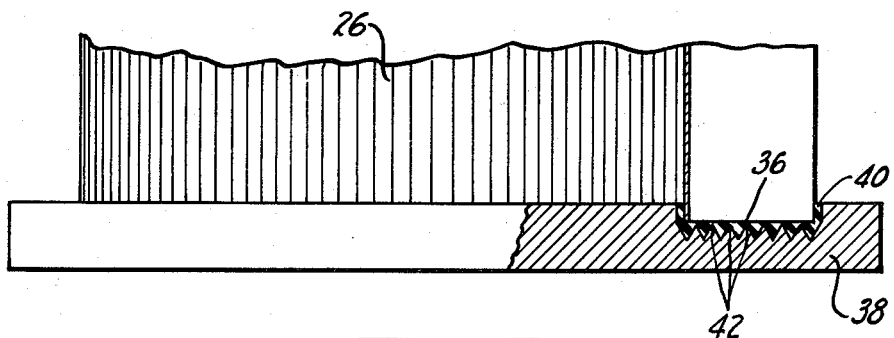
Figure 5 is a partial sectional view showing the relationship of the pleated element and the ridges in the mold during the molding process.

Referring to Figure 1, the filter consists of a head member 10, containing inlet passage 12, outlet passage 14, and a bowl 16 which is fastened to the head 10 by means of an annular threaded member 18. A filter element 20 is held tightly against head 10 by means of bolt 22 and spring 24. Element 20 consists of a cylindrical pleated paper filter element 26 embedded in endcaps 28 and 30. Endcaps 28 and 30 have grooves 32 molded therein, the adjacent grooves forming ridges 34.

In operation the fluid to be filtered enters inlet port 12 and flows into bowl 16 where it surrounds the filter element 20. It then passes through the pores of the pleated element and goes out the top of said element and out of passage 14. It is, of course, quite important that a good seal be made between endcap 30 and head 10, to prevent by-passing of unfiltered fluid past the element.

Figure 4:
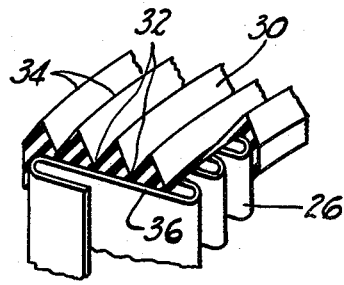
Figure 4 is an enlarged sectional view in perspective of a portion of the filter element taken on line 4—4 of Figure 3 with portions of the endcap broken away for clarity.

In the process of molding the endcaps, the ends 36 of the pleated element are immersed in a mold 38 filled with plastic composition 40 and cured for from three to ten minutes at 350–400° F. When ejected from the mold the ends 36 of the pleats will be covered with a tough rubber-like product called a "Plastisol." Plastisols, as known in the art, consist of (1) a vinyl resin, (2) fillers and/or pigments, (3) one or more plasticizers, and (4) stabilizers. Upon the application of heat, the liquid fuses together to form a homogeneous, uniform mass, free of volatile matter. The bottom of the mold has ridges 42 formed thereon so that the plastisol endcaps 28 and 30 will be formed with grooved outer faces as shown in Figures 4 and 5.

When properly molded with circular ridges according to this method, the ends of the pleats are all sealed. This is because the ridges in the mold separate the bottom of the mold from the pleated ends 36 of the element and allow these ends to be covered with a continuous uninterrupted film of plastic. This is not the case when the bottom of the mold is flat. The ridges in the mold thus space the pleated ends 36 from the bottom of the mold so that the pleated ends become embedded in the endcap only to a predetermined depth. The ridges or grooves in the bottom of the mold thus serve a dual purpose. Firstly, they permit the forming of an improved seal on the end of the filter pleats and secondly, they form ridges or grooves on the face of the endcaps which provide a better seal between the filter housing and the end of the filter pleats than could be obtained with endcaps formed with a smooth flat mold.

Although only one type of element is shown utilizing this grooved and molded endcap, it will be apparent to those skilled in the art that many modifications are possible. If desired, the element may be formed with a core. The molded endcap may be placed on other than pleated elements. Of course, the element may be of many sizes and shapes. Therefore, it should be understood that the invention is not to be limited to the particular modifications herein disclosed.

We claim:

1. A method of molding endcaps on a pleated filter element and spacing the end of said pleated filter element from the outer face of a molded endcap in which the pleated element is embedded, comprising the steps of filling a mold with a plastic composition, said mold having a multiplicity of concentric ridges formed on the bottom thereof, placing a pleated element into said mold so that the pleated ends thereof rest substantially on and crosswise of said multiplicity of ridges, in point contact therewith, curing said plastic composition until solid, and removing said element from said mold with a plastic endcap formed thereon.

2. A method of molding endcaps on a pleated filter element and spacing the end of said pleated filter element from the outer face of a molded endcap in which the pleated element is embedded, comprising the steps of filling a mold with a plastic composition, said mold having a substantially annular ridge formed on the bottom thereof, placing a pleated element into said mold so that the pleated ends thereof rest substantially on and crosswise of said ridge in point contact therewith, curing said plastic composition until solid, and removing said element from said mold with the plastic endcap formed thereon.

References Cited in the file of this patent

UNITED STATES PATENTS

| | | |
|---|---|---|
| 1,690,003 | Foerch | Oct. 30, 1928 |
| 1,754,496 | Barker | Apr. 15, 1930 |
| 2,532,080 | Benbow | Nov. 28, 1950 |
| 2,548,251 | Bergstein | Apr. 10, 1951 |
| 2,723,706 | Carter | Nov. 15, 1955 |
| 2,732,031 | Rabbitt et al. | Jan. 24, 1956 |

FOREIGN PATENTS

| | | |
|---|---|---|
| 680,211 | Great Britain | Oct. 1, 1952 |

UNITED STATES PATENT OFFICE

CERTIFICATE OF CORRECTION

Patent No. 2,934,791                   May 3, 1960

Walter Kasten et al.

It is hereby certified that error appears in the printed specification of the above numbered patent requiring correction and that the said Letters Patent should read as corrected below.

Column 2, lines 70 and 71, and column 3, lines 1 and 2, strike out "The ridges in the mold thus space the pleated ends 36 from the bottom of the mold so that the pleated ends become embedded in the endcap only to a predetermined depth." and insert the same after "plastic." in column 2, line 69.

Signed and sealed this 29th day of November 1960.

(SEAL)
Attest:
KARL H. AXLINE
Attesting Officer

ROBERT C. WATSON
Commissioner of Patents